(12) United States Patent
Arai et al.

(10) Patent No.: US 8,289,475 B2
(45) Date of Patent: Oct. 16, 2012

(54) LIQUID CRYSTAL DISPLAY APPARATUS

(75) Inventors: Norihiro Arai, Hino (JP); Kunpei Kobayashi, Tachikawa (JP); Ryota Mizusako, Sagamihara (JP)

(73) Assignee: Casio Computer Co., Ltd, Tokyo (JP)

( * ) Notice: Subject to any disclaimer, the term of this patent is extended or adjusted under 35 U.S.C. 154(b) by 399 days.

(21) Appl. No.: 12/606,397

(22) Filed: Oct. 27, 2009

(65) Prior Publication Data

US 2010/0103350 A1    Apr. 29, 2010

(30) Foreign Application Priority Data

Oct. 28, 2008    (JP) .................................. 2008-277135

(51) Int. Cl.
*G02F 1/1335*    (2006.01)
(52) U.S. Cl. ......................................................... 349/62
(58) Field of Classification Search .................... 349/65, 349/62
See application file for complete search history.

(56) References Cited

U.S. PATENT DOCUMENTS

| | | |
|---|---|---|
| 5,694,186 A | 12/1997 | Yanagawa et al. |
| 6,124,971 A | 9/2000 | Ouderkirk et al. |
| 6,630,968 B1 | 10/2003 | Tsuchihashi et al. |
| 6,909,479 B2 | 6/2005 | Iijima |
| 6,975,455 B1 | 12/2005 | Kotchick et al. |
| 7,106,395 B2 | 9/2006 | Maeda |
| 7,349,039 B2 | 3/2008 | Lee et al. |
| 7,440,056 B2 | 10/2008 | Kobayashi |
| 7,567,317 B2 | 7/2009 | Tanaka et al. |
| 7,599,021 B2 | 10/2009 | Tsuda et al. |
| 7,959,321 B2 | 6/2011 | Ryu et al. |
| 8,132,952 B2 | 3/2012 | Ryu et al. |
| 2002/0176036 A1 | 11/2002 | Kaneko |
| 2003/0058390 A1 | 3/2003 | Fujii |
| 2003/0081151 A1 | 5/2003 | Tsuchihashi et al. |
| 2003/0107692 A1 | 6/2003 | Sekiguchi |
| 2003/0124381 A1 | 7/2003 | Thompson et al. |
| 2005/0237749 A1 | 10/2005 | Epstein et al. |

(Continued)

FOREIGN PATENT DOCUMENTS

CN    1293768 A    5/2001

(Continued)

OTHER PUBLICATIONS

Korean Office Action dated Mar. 10, 2011 (and English translation thereof) in counterpart Korean Application No. 10-2009-0102040.

(Continued)

*Primary Examiner* — James Dudek
(74) *Attorney, Agent, or Firm* — Holtz Holtz Goodman & Chick PC

(57) ABSTRACT

A liquid crystal display apparatus includes a liquid crystal display device, a surface light source to irradiate light toward the device, an optical film disposed between the device and source, and a diffusion member disposed between the film and device. The device includes a pair of substrates facing to each other through a space with electrodes formed on at least one of opposite surfaces, a liquid crystal layer sealed into the space between the substrates, and a pair of polarizing plates arranged sandwiching the substrates therebetween. The film is made of a transparent film-like member and has two mutually faced film surfaces, one of the surfaces is formed into a planar shape, the other surface is formed into a convexo-concave structure with elongate microprisms in parallel to each other, and the film is disposed between the device and source with the one surface directed toward the device.

13 Claims, 10 Drawing Sheets

U.S. PATENT DOCUMENTS

| | | |
|---|---|---|
| 2006/0098456 A1 | 5/2006 | Sakamoto et al. |
| 2006/0152931 A1 | 7/2006 | Holman |
| 2006/0274248 A1 | 12/2006 | Kim et al. |
| 2006/0289880 A1 | 12/2006 | Kurihara |
| 2006/0290844 A1 | 12/2006 | Epstein et al. |
| 2007/0121030 A1 | 5/2007 | Sato |
| 2007/0147066 A1 | 6/2007 | Boyd et al. |
| 2008/0164806 A1 | 7/2008 | Chen |
| 2009/0027602 A1 | 1/2009 | Kobayashi |
| 2009/0073353 A1 | 3/2009 | Yu et al. |
| 2009/0103008 A1 | 4/2009 | Nasu et al. |
| 2009/0167981 A1 | 7/2009 | Arai et al. |
| 2010/0123856 A1 | 5/2010 | Arai et al. |
| 2010/0188605 A1 | 7/2010 | Hasegawa et al. |
| 2010/0188608 A1 | 7/2010 | Hoshi et al. |
| 2010/0245718 A1 | 9/2010 | Nishino et al. |
| 2010/0296036 A1 | 11/2010 | Fujii |

FOREIGN PATENT DOCUMENTS

| | | |
|---|---|---|
| CN | 1454329 A | 11/2003 |
| CN | 1249500 C | 4/2006 |
| CN | 1873496 A | 12/2006 |
| JP | 5-061046 A | 3/1993 |
| JP | 7-1427 A | 1/1995 |
| JP | 9-15597 A | 1/1997 |
| JP | 9-506985 A | 7/1997 |
| JP | 11-509331 A | 8/1999 |
| JP | 2000-66193 A | 3/2000 |
| JP | 2000-122046 A | 4/2000 |
| JP | 2001-235606 A | 8/2001 |
| JP | 2001-235623 A | 8/2001 |
| JP | 2001-281424 A | 10/2001 |
| JP | 2001-350008 A | 12/2001 |
| JP | 2002-107725 A | 4/2002 |
| JP | 2003-15133 A | 1/2003 |
| JP | 2003-98325 A | 4/2003 |
| JP | 2003-172927 A | 6/2003 |
| JP | 2003-172931 A | 6/2003 |
| JP | 2003-255317 A | 9/2003 |
| JP | 2003-279988 A | 10/2003 |
| JP | 2004-54034 A | 2/2004 |
| JP | 2004-93715 A | 3/2004 |
| JP | 2004-511811 A | 4/2004 |
| JP | 2004-287323 A | 10/2004 |
| JP | 2005-107278 A | 4/2005 |
| JP | 2006-138975 A | 6/2006 |
| JP | 2007-140453 A | 6/2007 |
| JP | 2007-534027 A | 11/2007 |
| JP | 2008-122834 A | 5/2008 |
| JP | 2009-157276 A | 7/2009 |
| KR | 7-1427 A | 1/1995 |
| KR | 10-0250720 B1 | 4/2000 |
| KR | 2004-0010272 A | 1/2004 |
| KR | 2004-0078925 A | 9/2004 |
| KR | 10-2006-0055341 A | 5/2006 |
| WO | 2006/104319 A1 | 10/2006 |

OTHER PUBLICATIONS

Japanese Office Action dated Oct. 26, 2010 (and English translation thereof) in counterpart Japanese Application No. 2008-277135.
U.S. Appl. No. 12/731,085, filed Mar. 24, 2010; First Named Inventor: Toshiharu Nishino; Title: "LCD Apparatus".
Japanese Office Action dated Jun. 14, 2011 and English translation thereof in counterpart Japanese Application No. 2008-277135.
U.S. Appl. No. 12/940,919; First Named Inventor: Norihiro Arai; Title: "Liquid Crystal Display Device"; Filed: Nov. 5, 2010.
U.S. Appl. No. 13/019,251; First Named Inventor: Toshiharu Nishino; Title: "LCD Apparatus"; Filed: Feb. 1, 2011.
U.S. Appl. No. 12/148,794, filed Apr. 22, 2008. Reflection/Transmission Type Liquid Crystal Display Apparatus to Norihiro Arai, et al.
U.S. Appl. No. 12/616,937, filed Nov. 12, 2009. Liquid Crystal Display Apparatus to Norihiro Arai, et al.
"Color LCD Technical Principle", revised edition (Nov. 30, 2011), Lien Tsun Chen, Jian-Hsin Publishing Inc.
U.S. Office Action dated Feb. 1, 2012 issued in related U.S. Appl. No. 12/616,937.

LIQUID CRYSTAL DISPLAY APPARATUS

CROSS-REFERENCE TO RELATED APPLICATIONS

This application is based upon and claims the benefit of priority under 35 USC 119 of Japanese Patent Application No. 2008-277135 filed on Oct. 28, 2008, the entire disclosure of which, including the description, claims, drawings, and abstract, is incorporated herein by reference in its entirety.

BACKGROUND OF THE INVENTION

1. Field of the Invention

The present invention relates to a liquid crystal display apparatus.

2. Description of the Related Art

As a reflection/transmission type liquid crystal display apparatus that performs reflection display using external light and transmission display using illumination light from a surface light source disposed on the side opposite to the observation side, there are known, for example, liquid crystal display apparatuses as below. One apparatus is described in Jpn. Pat. Appln. KOKAI Publication No. 2002-107725, wherein a surface light source is disposed on the side of a liquid crystal display device opposite to its observation side, and a semi-transmission/reflection film is disposed on the rear side (surface light source side) of a liquid crystal layer of the liquid crystal display device. Another apparatus is described in Jpn. Pat. Appln. KOKAI Publication No. 2004-93715, wherein a surface light source is disposed on the side of a liquid crystal display device opposite to its observation side, and a plurality of pixels of the liquid crystal display device are divided into two areas, and Then a reflection film is provided on the rear side of a liquid crystal layer in one area to form a reflection display section and a transmission display section for each of the plurality of pixels.

The problem of the conventional reflection/transmission type liquid crystal display apparatuses described above is that the reflection display is dark.

BRIEF SUMMARY OF THE INVENTION

A liquid crystal display apparatus according to the present invention includes a liquid crystal display device, a surface light source to irradiate illumination light toward the liquid crystal display device, an optical film disposed between the liquid crystal display device and the surface light source, and a diffusion member disposed between the optical film and the liquid crystal display device. The liquid crystal display device includes a pair of substrates that are arranged so as to face to each other through a space with a plurality of electrodes formed on at least one of opposite surfaces, a liquid crystal layer sealed into the space between the substrates, and a pair of polarizing plates arranged sandwiching the pair of substrates therebetween. The optical film is made of a transparent film-like member and has two mutually faced film surfaces, one of the two film surfaces is formed into a planar shape, the other film surface is formed into a convexo-concave structure in which a plurality of elongate microprisms are arranged in parallel to each other, and the optical film is disposed between the liquid crystal display device and the surface light source so that the one film surface is directed toward the liquid crystal display device.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained with reference to the drawings.

First Embodiment

Figure 1:
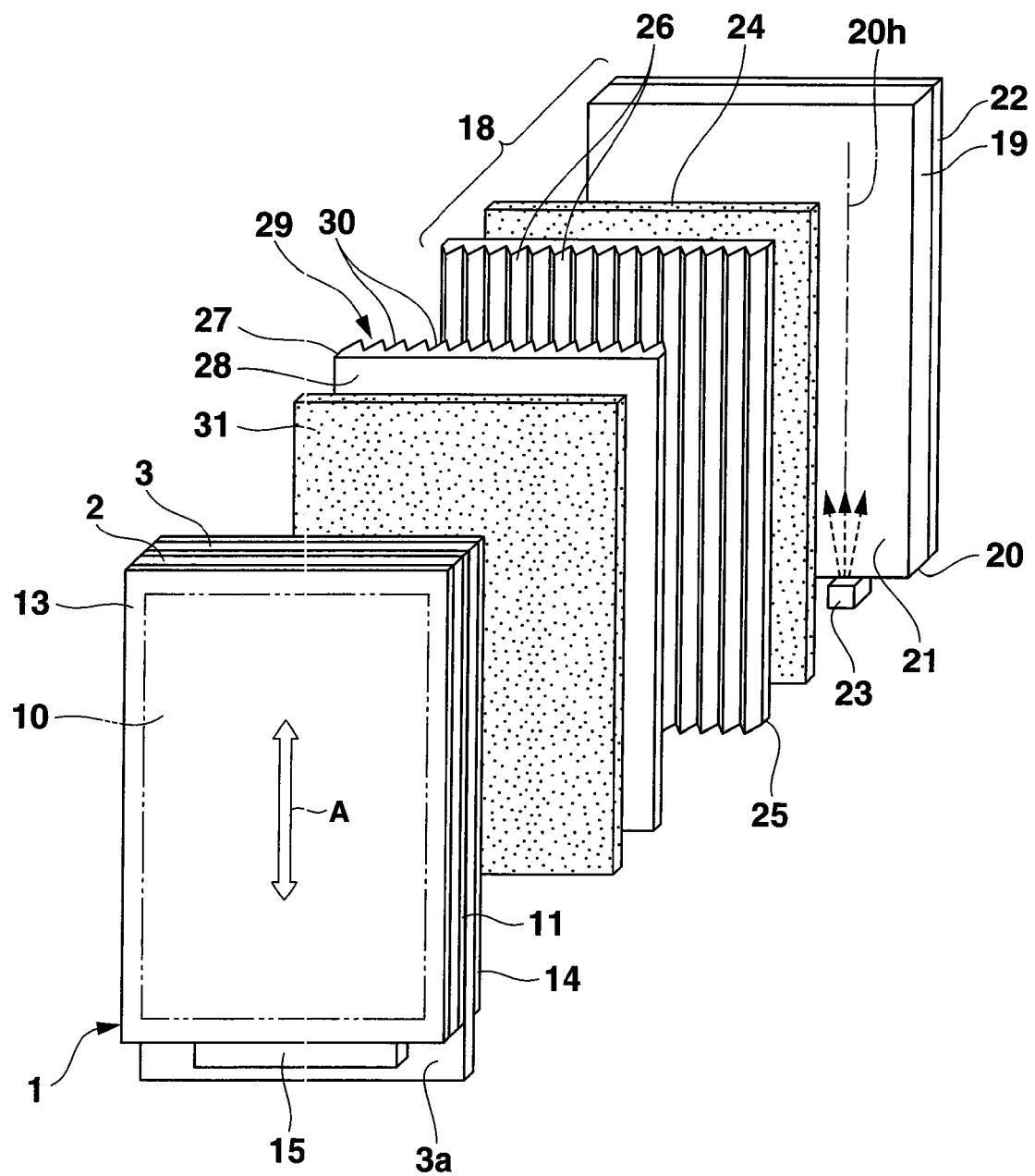
FIG. 1 is an exploded perspective view of a liquid crystal display apparatus showing a first embodiment of this invention.

FIG. 1 is an exploded perspective view of a liquid crystal display apparatus showing a first embodiment of this invention. This liquid crystal display apparatus is to perform reflection display and transmission display. The liquid crystal display apparatus includes: a liquid crystal display device 1; a surface light source 18, disposed on the side (hereinafter referred to as a rear side) of the liquid crystal display device 1 opposite to its observation side, to irradiate illumination light toward the liquid crystal display device 1; an optical film 27, disposed between the liquid crystal display device 1 and the surface light source 18, to serve as reflecting means for reflecting, toward the liquid crystal display device 1, light that has entered at the observation side and penetrated the liquid crystal display device 1; and a diffusion member 31 disposed on the side of the optical film 27 facing the liquid crystal display device 1.

Figure 2:
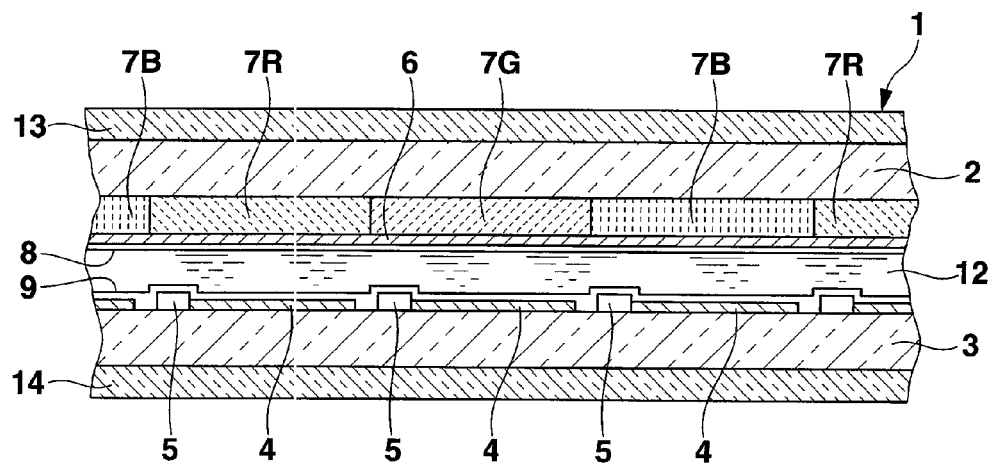
FIG. 2 is an enlarged sectional view of part of a liquid crystal display device 1.

FIG. 2 is an enlarged sectional view of part of the liquid crystal display device 1. The liquid crystal display device 1 has: a pair of transparent substrates 2 and 3 arranged so as to face to each other through a predetermined space with a plurality of transparent electrodes 6 and 4 being formed on at least one of opposite surfaces; a liquid crystal layer 12 sealed into the space between the substrates 2 and 3; and a pair of polarizing plates 13 and 14 arranged sandwiching the pair of substrates 2 and 3 therebetween. The alignment of liquid crystal molecules is changed by the application of an electric field across the electrodes 6 and 4, so that the transmission of light is controlled to performs display.

The liquid crystal display device 1 is, for example, an active matrix liquid crystal display device. The liquid crystal display device 1 is provided with: the plurality of pixel electrodes 4 arranged in a matrix form in row and column directions on the inner surface of one of the pair of the substrates 2 and 3, for example, the substrate 3 (hereinafter referred to as a rear substrate) opposite to the observation side; a plurality of thin film transistors (TFTs) 5 arranged to correspond to the pixel electrodes 4, respectively; and a plurality of scanning lines for supplying gate signals to the plurality of TFTs 5 in the respective rows as well as a plurality of signal lines (none of which are shown) for supplying data signals to the plurality of TFTs 5 in the respective columns. The opposed electrode 6 in the shape of a single film that faces the plurality of pixel electrodes 4 is provided on the inner surface of the other substrate, that is, the substrate 2 on the observation side (hereinafter referred to as a front substrate).

It is to be noted that the TFTs 5 are simplified in FIG. 2. The TFT 5 includes: a gate electrode formed on the surface of the rear substrate 3; a transparent gate insulating film provided on the substantially entire surface of the substrate in such a manner as to cover the gate electrode; an i-type semiconductor film formed on the gate insulating film to face the gate electrode; and drain and source electrodes formed on both sides of the i-type semiconductor film through n-type semiconductor films, respectively. The plurality of pixel electrodes 4 are formed on the gate insulating film, and connected to the source electrodes of the TFTs 5 corresponding to these pixel electrodes 4, respectively.

Furthermore, the plurality of scanning lines are formed on the plate surface of the rear substrate 3 so that each scanning line extends along one side of a corresponding one of the pixel electrode rows. The scanning lines are respectively connected to the gate electrodes of the TFTs 5 on the respective rows. The plurality of signal lines are formed on the gate insulating film so that each signal line extends along one side of a corresponding one of the pixel electrode columns. The signal lines are respectively connected to the drain electrodes of the TFTs on the respective columns.

The liquid crystal display device 1 further has three red, green and blue filters 7R, 7G and 7B respectively provided in correspondence with pixels that are formed of areas where the plurality of pixel electrodes 4 face the opposed electrode 6. The color filters 7R, 7G and 7B are provided on the inner surface of one of the pair of substrates, e.g., the observation-side substrate 2. The opposed electrode 6 is formed on the color filters 7R, 7G and 7B.

Aligning films 8 and 9 are formed on the inner surfaces of the pair of substrates 2 and 3 to cover the electrodes 4 and 6. Aligning treatment is applied to the inner surfaces of the pair of substrates 2 and 3 by rubbing the film surfaces of the aligning films 8 and 9 in predetermined directions, respectively.

The pair of substrates 2 and 3 are joined to each other through a frame-like seal member 10 (see FIG. 1) surrounding a screen area 10 where the pixels are arranged in a matrix form. The liquid crystal layer 12 is sealed into the area surrounded by the seal member 10 between the substrates 2 and 3.

The liquid crystal molecules in the liquid crystal layer 12 are aligned in a state regulated by the aligning treatment of the aligning films 8 and 9. The pair of polarizing plates 13 and 14 arranged sandwiching the pair of substrates 2 and 3 therebetween are affixed to the outer surfaces of the pair of polarizing plates 13 and 14 so that the transmission axes of these polarizing plates 13 and 14 are directed to enable sufficient enhancement of the contrast of display between a field-free state and a field-applied state. In addition, out of the pair of polarizing plates 13 and 14, the rear (observation side) polarizing plate 13 is made of an antiglare polarizing plate whose outer surface is treated to prevent the reflection of external light.

The liquid crystal display device 1 includes the screen area 10 having a rectangular shape whose width is greater in the longitudinal direction of the liquid crystal display device 1 than in its lateral direction when electronic equipment on which the liquid crystal display device 1 is mounted is used, for example. The screen area 10 is designed so that a viewing angle azimuth A that enables display to be observed with the highest contrast may be provided in a predetermined direction, for example, in the longitudinal direction of the screen area 10.

Moreover, the liquid crystal display device 1 may be any one of the following: a TN type or STN type in which the liquid crystal molecules in the liquid crystal layer 12 are aligned in a twisted state between the pair of substrates 2 and 3, a vertical alignment type in which the liquid crystal molecules are aligned substantially perpendicularly to the surfaces of the substrates 2 and 3, a non-twisted horizontal alignment type in which the liquid crystal molecules are aligned substantially in parallel to the surfaces of the substrates 2 and 3 so that the major axes of the molecules are oriented in one direction, a bend alignment type in which the liquid crystal molecules are aligned in a bent state, or a ferroelectric or antiferroelectric liquid crystal display device.

The liquid crystal display device 1 is not limited to the liquid crystal display device in which the electrodes 6 and 4 for forming a plurality of pixels are provided on each of the inner surfaces of the pair of substrates 2 and 3. Alternatively, the liquid crystal display device 1 may be a horizontal field control type. In this case, on the inner surface of one of the pair of substrates 2 and 3, for example, the rear substrate 3, there are provided a first electrode for forming a plurality of pixels, and a second electrode that is formed closer to a liquid crystal layer than the first electrode in such a manner as to be insulated from the first electrode and that has a plurality of elongate electrode portions. A horizontal electric field (electric field directed along the surface of the substrate) is generated across the electrodes to change the alignment of liquid crystal molecules.

Furthermore, as shown in FIG. 1 and FIG. 2, the rear substrate 3 of the liquid crystal display device 1 has a projection 3a that projects outward from the front substrate 2. The scanning lines and the signal lines provided on the inner surface of the rear substrate 3 are connected to a display driver 15 mounted on the projection 3a.

On the other hand, as shown in FIG. 1, the surface light source 18 includes a light guide plate 19. The light guide plate 19 is made of a transparent plate-like member having an area corresponding to the whole screen area 10 of the liquid crystal display device 1, that is, a plate-like member formed into a rectangular shape that is sized greater in its longitudinal direction to correspond to the shape of the screen area 10 of the liquid crystal display device 1. The light guide plate 19 is provided with an entrance end face 20 where light enters on one of two short sides of the rectangle, for example, on an end face of the short side corresponding to the lower short side of the screen area 10, an exit face 21 for the light that has entered through the entrance end face 20 on one of two plate surfaces, and a reflection film 22 to reflect, toward the exit face 21, the light that has entered through the entrance end face 20 on the plate surface opposite to the exit face 21. The light guide plate 19 is disposed so that the exit face 21 is directed toward the liquid crystal display device 1. The surface light source 18 further includes a plurality of light emitting elements 23 that are constituted of light emitting diodes (LEDs) or the like arranged to face the entrance end face 20 of the light guide plate 19, and a diffusion layer 24 and one prism array 25 arranged on the exit surface side of the light guide plate 19.

The diffusion layer 24 is made of, for example, a transparent resin film in which scattering particles are dispersed. The diffusion layer 24 is disposed between the light guide plate 19 and the prism array 25, and is affixed onto the exit face 21 of the light guide plate 19.

The prism array 25 is made of a transparent member formed into a prism surface. The surface of the prism array 25 facing the light guide plate 19 is formed into a planar surface. On the opposite surface of the prism array 25, that is, the surface facing the liquid crystal display device 1, a plurality of elongate microprisms 26 are arranged in parallel to each other in a direction perpendicular to their longitudinal direction. The microprisms 26 collect the light that has exited from the exit face 21 of the light guide plate 19, and applies this light to the liquid crystal display device 1. The longitudinal direction of the microprisms 26 is substantially parallel to a normal direction 20h of the entrance end face 20 of the light guide plate 19. The planar surface of the prism array 25 is affixed onto the diffusion layer 24.

The section of each of the microprisms 26 of the prism array 25 is in the shape of an isosceles triangle whose center is in the normal direction of the liquid crystal display device 1 (a direction perpendicular to the plate surfaces of the substrates 2 and 3). The light that has exited from the exit face 21 of the light guide plate 19 and has been diffused by the diffusion layer 24 is emitted by the plurality of microprisms 26 toward the liquid crystal display device 1 so that the light is refracted in a direction to decrease its angle with the normal direction.

The surface light source 18 guides, by the light guide plate 19, the light emitted by the plurality of light emitting elements 23, and thus applies this light to the liquid crystal display device 1. The plurality of light emitting elements 23 are turned on when the transmission display using the illumination light from the surface light source 18 is performed.

The surface light source 18 causes the light that has exited from the plurality of light emitting elements 23 and entered the light guide plate 19 through its entrance end face 20 to be repeatedly reflected by the reflection film 22 and internally reflected by the exit face 21 of the light guide plate 19. Thereby, the surface light source 18 guides the light into the entire light guide plate 19, and then causes the Light to exit from the whole exit face 21 of the light glide plate 19. The surface light source 18 diffuses the light by the diffusion layer 24, and collects the light by the plurality of microprisms 26 of the prism array 25, and then irradiates the light toward the Liquid crystal display device 1.

In the surface light source 18, the prism array 25 is disposed so that the longitudinal direction of its microprisms 26 is substantially parallel to the normal direction 20h of the entrance end face 20 of the light guide plate 19. Thus, the surface light source 18 can transmit, with high transmissivity, the light that has entered through the entrance end face 20 of the light guide plate 19 and exited from the exit face 21 of the light guide plate 19 and then diffused by the diffusion layer 24. The surface light source 18 can also collect light in the normal direction of the liquid crystal display device 1 perpendicularly to the normal direction 20h of the entrance end face 20 of the light guide plate 19, and emit illumination light with high front luminance (light having an intensity distribution in which the intensity of light radiating in a direction close to the normal line of the liquid crystal display device 1 is high) toward the liquid crystal display device 1.

In addition, in the surface light source 18 of this embodiment, the reflection film 22 is provided on the plate surface of the light guide plate 19 opposite to the exit face 21. Alternatively, the reflection film 22 may be disposed to leave a space between this reflection film 22 and the light guide plate 19, and the light that has entered the light guide plate 19 through its entrance end face 20 may be internally reflected toward the exit face 21 by the plate surface of the light guide plate 19 opposite to the exit face 21, so that leakage light that has penetrated an interface between the opposite plate surface and an air layer in the space may be reflected by the reflection film 22 and returned into the light guide plate 19.

Furthermore, the optical film 27 is made of a transparent film-like member. The optical film 27 is a prism sheet having two mutually faced film surfaces. One of the two film surfaces, one film surface (hereinafter referred to as a planar surface) 28, is formed into a planar shape. The other film surface (hereinafter referred to as a convexo-concave surface) 29 is formed into a convexo-concave structure in which a plurality of elongate microprisms 30 are arranged in parallel to each other in a direction perpendicular to their longitudinal direction. The optical film 27 is disposed between the liquid crystal display device 1 and the surface light source 18 so that the planar surface 28 is directed toward the liquid crystal display device 1 and so that the normal direction of the planar surface 28 is coincident with the normal direction of the liquid crystal display device 1.

Figure 3:
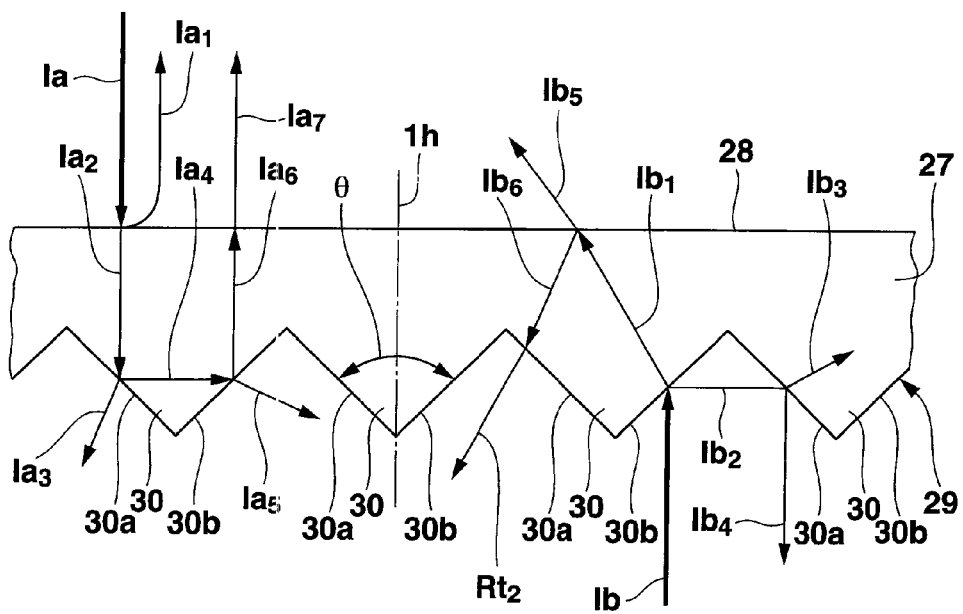
FIG. 3 is an enlarged sectional view of part of an optical film without hatching.

FIG. 3 is an enlarged sectional view of part of optical film 27 without hatching. This optical film 27 has the convexo-concave surface 29 where the plurality of elongate microprisms 30 each having a sectional shape of an isosceles triangle whose center is in the normal direction of the liquid crystal display device 1 are arranged. The apex angle θ of the microprism 30 is set at 80° to 100°, preferably at substantially 90°.

The optical film 27 reflects, toward the liquid crystal display device 1, the light that has entered the liquid crystal display device 1 at its observation side and penetrated the liquid crystal display device 1 and then entered the optical film 27 at the side of the planar surface 28. The optical film 27 transmits the light that has been irradiated from the surface light source 18 and entered the optical film 27 through the convexo-concave surface 29 to cause the light to exit toward the liquid crystal display device 1.

That is, as shown in FIG. 3, light Ia that has penetrated the liquid crystal display device 1 from the observation side and entered the optical film 27 through its planar surface 28 is reflected by the planar surface 28 or enters the optical film 27 through the planar surface 28. Then, the light Ia is reflected by one of two tilted surfaces 30a and 30b of each of the microprisms 30 toward the other of the tilted surfaces 30a and 30b, and further reflected by the other of the tilted surfaces 30a and 30b, and then exits from the planar surface 28.

In FIG. 3, Ia1 denotes light reflected by the planar surface 28. The reflected light Ia1 is reflected at a reflection angle (90° in FIG. 3) corresponding to the incidence angle of the light Ia entering through the planar surface 28.

Furthermore, Ia2 denotes light that has entered the optical film 27 through the planar surface 28. Ia3 denotes light that has entered the optical film 27 and exited toward the surface light source 18 from one tilted surface of the microprism 30, for example, the left tilted surface 30a in FIG. 3. Ia4 denotes light that has entered the optical film 27 and has been reflected by the left tilted surface 30a of the microprism 30 toward the other tilted surface (right tilted surface) 30b. Ia5 denotes light that has exited toward the surface light source 18 from the right tilted surface 30b. Ia6 denotes light that has been reflected by the other tilted surface 30b toward the planar surface 28. Ia7 denotes light that has exited from the planar surface 28. The light Ia1 that has been reflected by the planar surface 28 and the light Ia7 that has been reflected by the left tilted surface 30a and the right tilted surface 30b of the microprism 30 and exited from the planar surface 28 enter the liquid crystal display device 1 at its rear side (the side opposite to the observation side).

In addition, the apex angle θ of the microprism 30 is set at 80° to 100° (preferably at substantially 90°). Accordingly, when the incidence angle of the light Ia entering through the planar surface 28 is 90°, the exit angle of the light Ia7 that has been reflected by the one tilted surface 30a and the other tilted surface 30b of the microprism 30 and exited from the planar surface 28 is 90°.

Moreover, light Ib that has been irradiated from the surface light source 18 and entered the optical film 27 through the convexo-concave surface 29 in which the plurality of microprisms 30 are formed enters one of the two tilted surfaces 30a and 30b of the microprism 30. Out of the light Ib, light that has entered the microprism 30 penetrates the optical film 27 and exits from the planar surface 28.

In FIG. 3, Ib1 denotes light that has entered the microprism 30 through its right tilted surface 30b. Ib2 denotes light that has been reflected by the right tilted surface 30b of the microprism 30 toward the right microprism 30 adjacent to the former microprism 30. The reflected light Ib2 enters the adjacent microprism 30 through the left tilted surface 30a, or is reflected by the left tilted surface 30a of the adjacent microprism 30. Ib3 denotes light that has entered the adjacent microprism 30. Ib4 denotes light that has been reflected by the tilted surface 30a of the adjacent microprism 30.

On the other hand, the light Ib1 that has entered the microprism 30 through its right tilted surface 30b penetrates the optical film 27 toward its planar surface 28. Out of the light Ib1, light Ib5 that has penetrated the planar surface 28 exits from the planar surface 28 toward the liquid crystal display device 1.

In addition, out of the light Ib1 that has penetrated the optical film 27, light Ib6 that has been reflected by the planar surface 28 exits toward the surface light source 18 from one of the two tilted surfaces 30a and 30b of the microprism 30.

Furthermore, the diffusion member 31 that is provided on the side of the optical film 27 facing the liquid crystal display device 1 is made of a transparent resin film in which scattering particles are dispersed. The diffusion member 31 is disposed and affixed on the planar surface 28 of the optical film 27.

A stack of the optical film 27 and the diffusion member 31 is disposed so that the longitudinal direction of the plurality of microprisms 30 of the optical film 27 is substantially parallel to the viewing angle azimuth A of the liquid crystal display device 1. The surface of the diffusion member 31 facing the liquid crystal display device 1 is affixed to the outer surface of the rear polarizing plate 14 of the liquid crystal display device 1.

The light guide plate 19 of the surface light source 18 is disposed so that the normal direction 20h of its entrance end face 20 is substantially parallel to the viewing angle azimuth A of the liquid crystal display device 1. The prism array 25 provided on the exit surface side of the light guide plate 19 is disposed so that the longitudinal direction of its microprisms 26 is substantially parallel to the normal direction 20h of the entrance end face 20 of the light guide plate 19 and to the longitudinal direction of the plurality of microprisms 30 of the optical film 27. The apexes of the plurality of microprisms 26 are in proximity to or in contact with the apexes of the plurality of microprisms 30.

In this liquid crystal display apparatus, the optical film 27 is disposed between the liquid crystal display device 1 and the surface light source 18 located opposite to the observation side of the liquid crystal display device 1. The optical film 27 reflects, toward the liquid crystal display device 1, light that has entered the liquid crystal display device 1 at its observation side and penetrated the liquid crystal display device 1 and then entered the optical film 27 through the planar surface 28. The optical film 27 also transmits the light that has been irradiated from the surface light source 18 and entered the optical film 27 through the convexo-concave surface 29, and irradiates the light toward the liquid crystal display device 1. As a result, the liquid crystal display apparatus can perform bright reflection display and transmission display without using any semitransparent reflection film in contrast with conventional reflection/transmission type liquid crystal display apparatuses and without forming any reflection display section and transmission display section for each of the plurality of pixels of the liquid crystal display device.

Moreover, in the optical film 27, one film surface 28 is formed into a planar shape. The other film surface 29 is formed into a convexo-concave structure in which the plurality of elongate microprisms 30 are arranged in parallel to each other in a direction perpendicular to their longitudinal direction. The optical film 27 is disposed so that the planar surface 28 is directed toward the liquid crystal display device 1. Thus, light that has entered the liquid crystal display device 1 at its observation side and penetrated the liquid crystal display device 1 can be reflected by the optical film 27 with high reflectance. The luminance of this reflected light can be increased so that the reflection display may be brighter.

Figure 4:
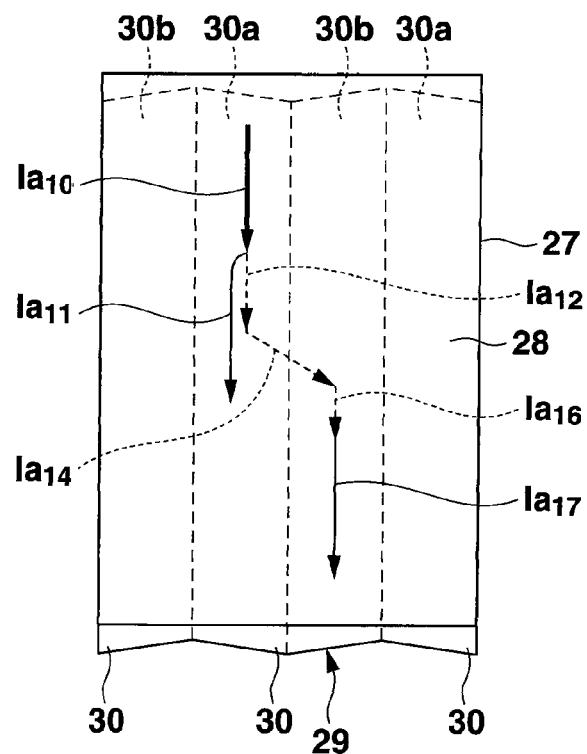
FIG. 4 is a plan view showing reflected rays of light that has entered the optical film at its planar surface side in a direction tilted in the longitudinal direction of a microprism with respect to the normal direction of the liquid crystal display device.
Figure 5:
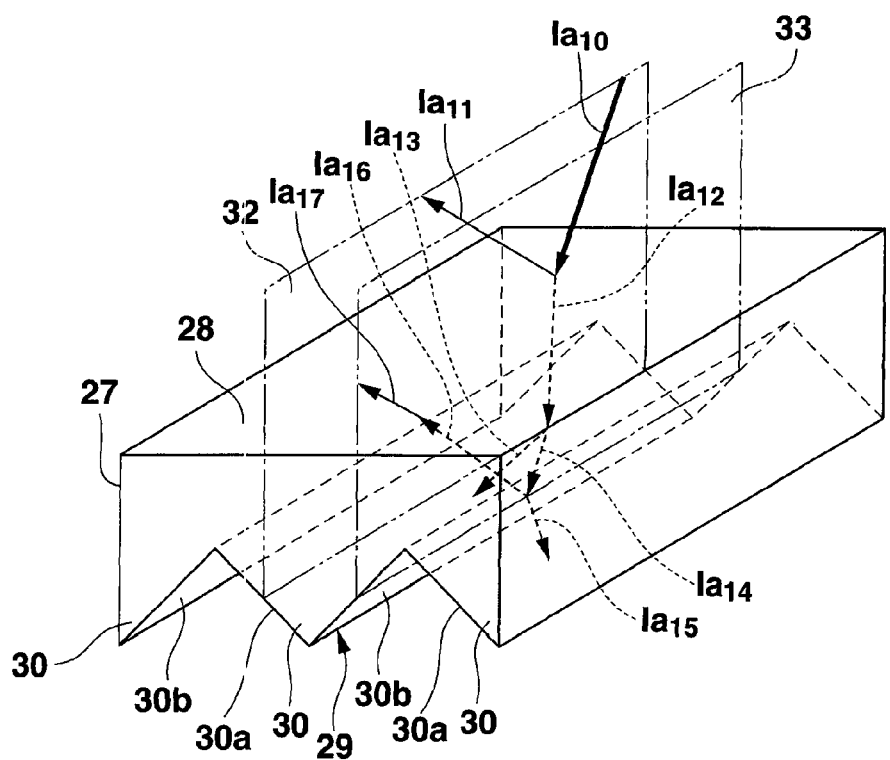
FIG. 5 is a perspective view showing the reflected rays of light that has entered the optical film at its planar surface side in the direction tilted in the longitudinal direction of the microprism with respect to the normal direction of the liquid crystal display device.

FIG. 4 and FIG. 5 are a plan view and a perspective view each showing the reflected rays of light that has entered the optical film 27 at its planar surface 28 side in a direction tilted in the longitudinal direction of the microprism 30 of the optical film 27 with respect to the normal direction of the liquid crystal display device 1.

As in FIG. 5, suppose that a first perpendicular surface 32 is a surface that is parallel to the normal direction of the liquid crystal display device 1 and to the longitudinal direction of the microprism 30 of the optical film 27 and that penetrates one tilted surface 30a of the microprism 30. Light Ia10 that has entered the optical film 27 at the planar surface 28 in a direction tilted in the direction of an end of the microprism 30 with respect to the normal direction of the liquid crystal display device 1 along the first perpendicular surface 32 is partly reflected by the planar surface 28 of the optical film 27. Resultant reflected light Ia11 irradiates on the first perpendicular surface 32 in a direction (regular reflection direction) tilted at an angle corresponding to the incidence angle of the incident light Ia10 in the direction of the other end of the microprism 30 with respect to the normal direction of the liquid crystal display device 1, as shown in FIG. 4 and FIG. 5.

Furthermore, out of the light Ia10 that has entered at the planar surface 28, light Ia12 that has entered the optical film 27 through the planar surface 28 is refracted by the planar surface 28 and travels on the first perpendicular surface 32. The light Ia12 is reflected by one tilted surface 30a of the microprism 30, and, as light Ia14, travels toward the other tilted surface 30b of the microprism 30. The light Ia14 is reflected by the other tilted surface 30b, and, as light Ia16, travels toward the planar surface 28. The light Ia16 is further refracted by the planar surface 28, and as light Ia17, irradiates toward the liquid crystal display device 1.

In addition, in FIG. 4 and FIG. 5, Ia13 (not shown in FIG. 4) denotes exit light that has entered the optical film 27 through the planar surface 28 and exited toward the surface light source 18 from one tilted surface 30a of the microprism 30. Ia15 (not shown in FIG. 4) denotes exit light that has exited toward the surface light source 18 from the other tilted surface 30b.

Here, the light Ia14 is reflected by one tilted surface 30a of the microprism 30 in a direction tilted from the first perpendicular surface 32, and is further reflected by the other tilted surface 30b of the microprism 30.

Furthermore, the light Ia16 that has been reflected by the other tilted surface 30b travels toward the planar surface 28 within the microprism 30, and exits from the planar surface 28 as the light Ia17 that has been refracted by the planar surface 28. The light Ia17 exiting from the planar surface 28 irradiates on a second perpendicular surface 33 that is parallel to the normal direction of the liquid crystal display device 1 and the longitudinal direction of the microprism 30 and that passes on the other tilted surface 30b of the microprism 30, in a direction (regular reflection direction) tilted at an angle corresponding to the incidence angle of the incident light Ia10 in the direction of the other end of the microprism 30 with respect to the normal direction of the liquid crystal display device 1.

Accordingly, the light Ia11 that has been refracted by the planar surface 28 of the optical film 27 and the light Ia17 that has entered the optical film 27, has been reflected by one tilted surface 30a and the other tilted surface 30b of the microprism 30 and exited from the planar surface 28 respectively travel along the first perpendicular surface 32 and the second perpendicular surface 33 parallel to each other in directions substantially parallel to each other.

Thus, light that has entered the liquid crystal display device 1 at its observation side and penetrated the liquid crystal display device 1 and then entered the optical film 27 is reflected by the optical film 27 as high-luminance light in that the light Ia11 that has been reflected by the planar surface 28 of the optical film 27 is added to the light Ia17 that has been reflected by one tilted surface 30a and the other tilted surface 30b of the microprism 30 of the optical film 27 and exited from the planar surface 28.

On the contrary, when the optical film 27 is disposed so that the convexo-concave surface 29 in that the plurality of microprisms 30 are formed is directed toward the Liquid crystal display device 1, the luminance of the light reflected by the optical film 27 is low.

Figure 6:
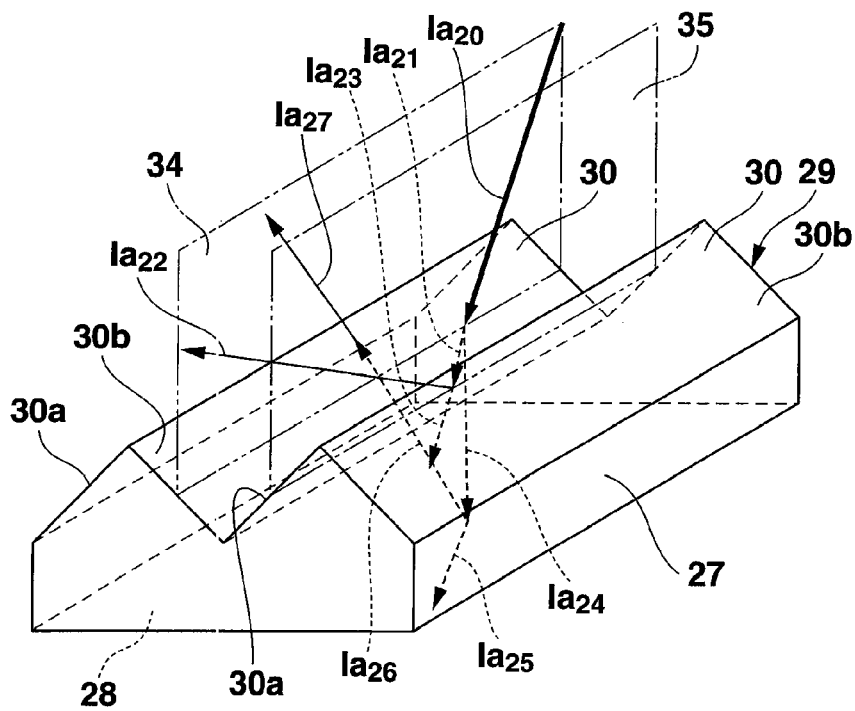
FIG. 6 is a perspective view showing reflected rays of light that has entered the optical film in the direction tilted in the longitudinal direction of the microprism with respect to the normal direction of the liquid crystal display device, in the case where the optical film is disposed so that its convexo-concave surface is directed toward the liquid crystal display device.

FIG. 6 is a perspective view showing reflected rays of light that has entered the optical film 27 in the direction tilted in the longitudinal direction of the microprism 30 of the optical film 27 with respect to the normal direction of the liquid crystal display device 1, in the case where the optical film 27 is disposed so that the convexo-concave surface 29 is directed toward the liquid crystal display device 1.

As shown in FIG. 6, suppose that a first perpendicular surface 34 is a surface that is parallel to the normal direction of the liquid crystal display device 1 and to the longitudinal direction of the microprism 30 of the optical film 27 and that passes on the right tilted surface 30b of one of the adjacent two microprisms 30, 30, for example, the left microprism (hereinafter referred to as a left prism). When the optical film 27 is disposed so that the convexo-concave surface 29 in which the plurality of microprisms 30 are formed is directed toward the liquid crystal display device 1, light Ia20 that has entered the optical film 27 in the direction tilted in the direction of the end of the microprism with respect to the normal direction of the liquid crystal display device 1 on the first perpendicular surface 34 is partly reflected by the right tilted surface 30b of the left prism 30, and travels, as light Ia21, toward the left prism 30. The light Ia21 is further reflected by the left tilted surface 30a of the right prism 30, and travels, as exit light Ia22, toward the liquid crystal display device 1. The light Ia22 traveling toward the liquid crystal display device 1 travels along a second perpendicular surface 35 that is parallel to the normal direction of the liquid crystal display device 1 and to the longitudinal direction of the microprism 30 and that passes on the left tilted surface 30a of the other microprism, that is, the right microprism (hereinafter referred to as a right prism), in a direction tilted at an angle corresponding to the incidence angle of the incident light Ia20 in the direction of the other end of the microprism 26 with respect to the normal direction of the liquid crystal display device 1.

In addition, in FIG. 6, Ia23 denotes light that has been reflected toward the right prism 30 by the right tilted surface 30b of the left prism 30 and entered the right prism 30.

On the other hand, out of the light Ia20 that has entered the right tilted surface 30b of the left prism 30, light that has entered the left prism 30 travels in the optical film 27 as light Ia24 refracted by the left tilted surface 30a. The light Ia24 is reflected by the opposite planar surface 28, and becomes light Ia26. The light Ia26 is refracted by the left tilted surface 30a of the right prism 30, and exits, as light Ia27, from the left prism 30.

In addition, in FIG. 6, Ia25 denotes light that has entered the left prism 30 and exited from the planar surface 28 toward the surface light source 18.

As shown in FIG. 6, the light Ia27 that has exited from the left tilted surface 30a of the left prism 30 exits in a direction intersecting with the second perpendicular surface 35, and travels in a direction different from the direction of the light Ia22 that travels on the second perpendicular surface 35 and that has been reflected on the surface of the prism. Accordingly, the light Ia22 that has been reflected on the surface of the prism and the light Ia27 that has entered and has been reflected by the prism exit in dispersed directions.

Thus, if the optical film 27 is disposed so that its convexo-concave surface 29 is directed toward the liquid crystal display device 1, the luminance of the light reflected by the optical film 27 toward the liquid crystal display device 1 is low.

As described above, in this liquid crystal display apparatus in which the optical film 27 is disposed so that its planar surface 28 is directed toward the liquid crystal display device 1, the luminance of the light reflected toward the liquid crystal display device 1 is higher and the luminance of the reflection display is thus higher than in the case where the optical film 27 is disposed so that its convexo-concave surface 29 is directed toward the liquid crystal display device 1.

Furthermore, in this liquid crystal display apparatus, the diffusion member 31 is disposed on the planar surface 28 side of the optical film 27 facing the liquid crystal display device 1. Thus, in the case of the reflection display, light reflected by the optical film 27 toward the liquid crystal display device 1 is diffused by the diffusion member 31 and thereby caused to enter the liquid crystal display device 1. In the case of the transmission display, illumination light irradiated from the surface light source 18 is diffused by the diffusion member 31 and can thereby be caused to enter the liquid crystal display device 1. Consequently, a high-quality image with no uneven luminance can be displayed both in the reflection display and the transmission display.

Moreover, in this liquid crystal display apparatus, the optical film 27 is disposed so that the longitudinal direction of its microprisms 30 is substantially parallel to the viewing angle azimuth A of the liquid crystal display device 1. Thus, the light that has been reflected by the optical film 27 in the reflection display and the light that has penetrated the optical film 27 in the transmission display exit in such a manner as to expand in a direction substantially perpendicular to the viewing angle azimuth A. Consequently, the viewing angle perpendicular to the viewing angle azimuth A can be wide both in the reflection display and the transmission display.

In this embodiment, the liquid crystal display device 1 has the viewing angle azimuth A in the longitudinal direction of the screen area 10. The optical film 27 is disposed so that the longitudinal direction of its microprisms 30 is substantially parallel to the viewing angle azimuth A of the liquid crystal display device 1. Thus, the viewing angle in the lateral direction of the screen area 10 can be wide.

Figure 7:
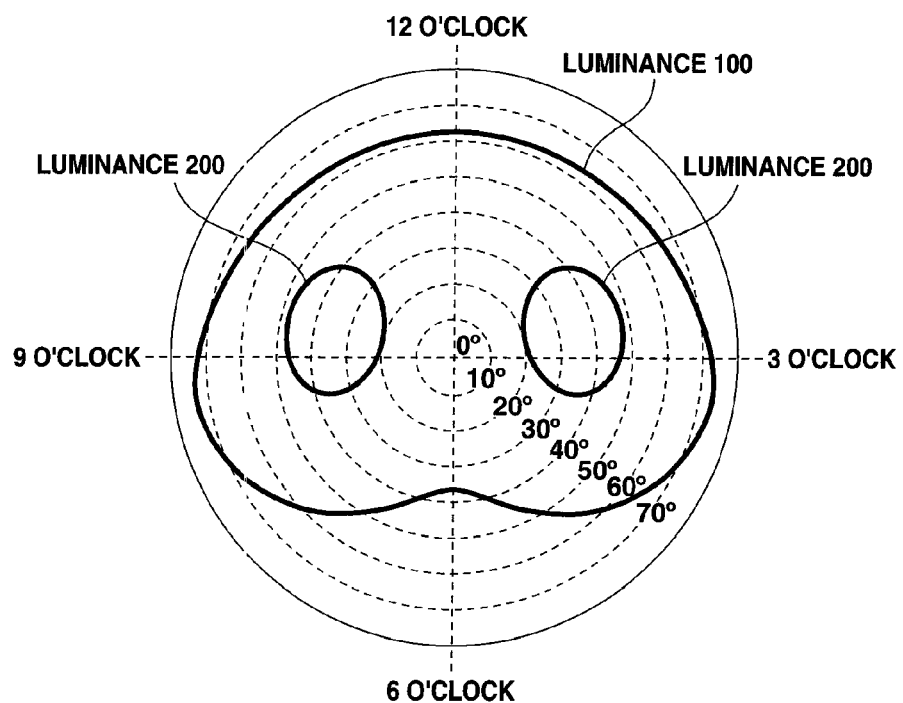
FIG. 7 is an equal luminance graph of the display of white in the case of reflection display of the liquid crystal display apparatus in the first embodiment.

FIG. 7 is an equal luminance graph of the display of white in the case of the reflection display of the liquid crystal display apparatus in the embodiment described above. In FIG. 7, 12 o'clock and 6 o'clock indicate the azimuth (equal to the viewing angle azimuth A) of the upward and downward directions of the screen area 10. 9 o'clock and 3 o'clock indicate the azimuth of the leftward and rightward directions of the screen area 10. A plurality of concentric circles shown by broken lines indicate the tilt angles in the observation direction with respect to the normal direction (a direction at 0°) of the liquid crystal display device 1.

As shown in FIG. 7, the luminance distribution of the display of white in the case of the reflection display of the liquid crystal display apparatus in the embodiment described above shows that an observation angle at which the display of white having a luminance of 100 or more can be observed widely extends to an angular range of about 70° in the left and right directions. Thus, the viewing angle of the screen area 10 in the left and right directions can be wide.

Furthermore, in the liquid crystal display apparatus in the embodiment described above, the prism array 25 located on the exit side of the light guide plate 19 of the surface light source 18 is adjacent to the optical film 27 so that the surface in which the plurality of microprisms 26 of the prism array 25 are formed faces the convexo-concave surface 29 in which the plurality of microprisms 30 of the optical film 27 are formed. However, the prism array 25 is disposed so that the longitudinal direction of its microprisms 26 is substantially parallel to the longitudinal direction of the plurality of microprisms 30 of the optical film 27. Thus, even when the apexes of the microprisms 26 of the prism array 25 come into contact with the apexes of the microprisms 30 of the optical film 27, there is no damage due to the contact between the apexes of the microprisms 26 and 30 because this contact is a line contact along the longitudinal direction of the microprisms 26 and 30.

Second Embodiment

Figure 8:
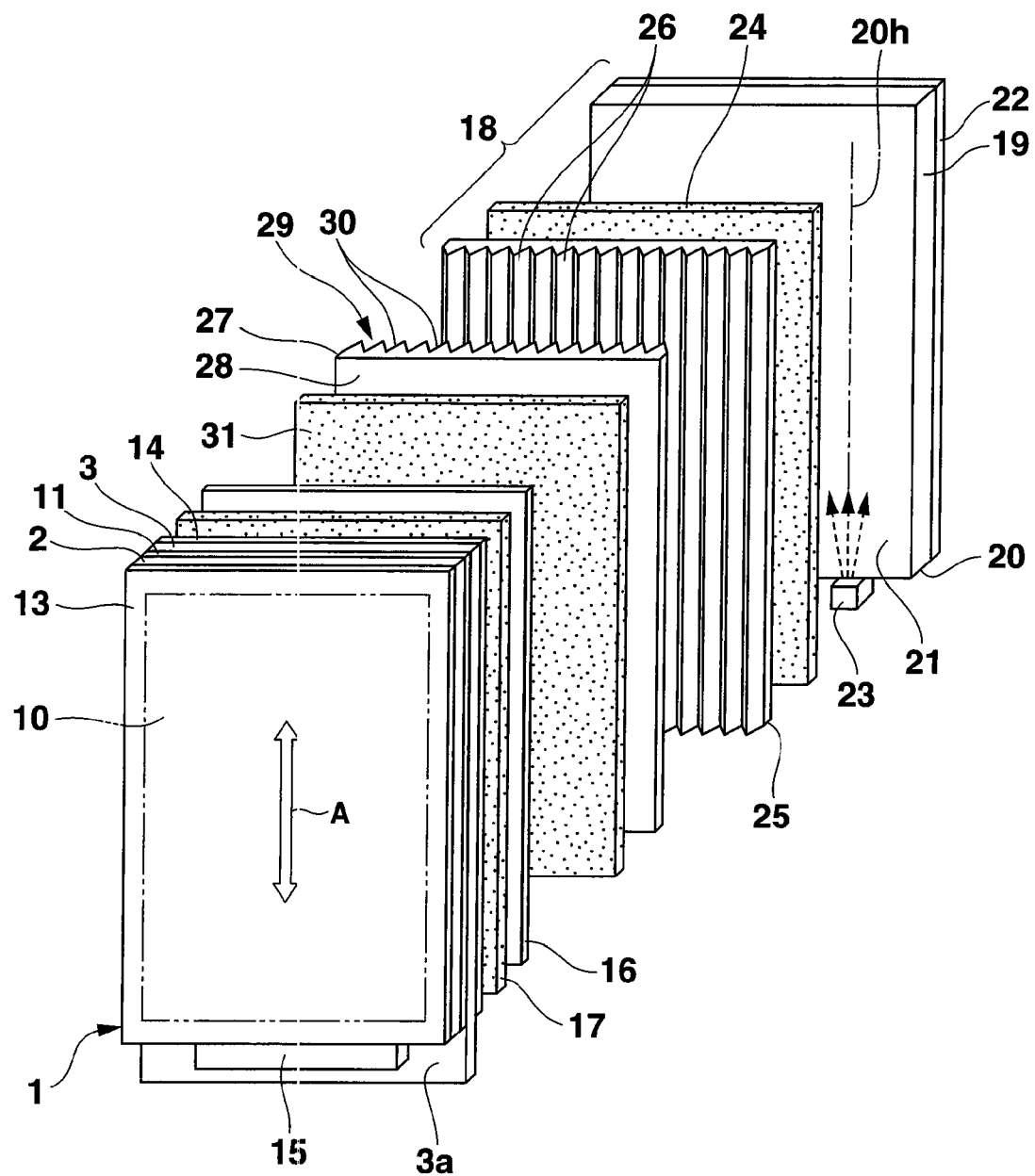
FIG. 8 is an exploded perspective view of a liquid crystal display apparatus showing a second embodiment of this invention.

FIG. 8 is an exploded perspective view of a liquid crystal display apparatus showing a second embodiment of this invention. It is to be noted that the same reference numbers are assigned to parts in this embodiment that are equivalent to the parts in the first embodiment, and the same parts are not described.

In this embodiment, the liquid crystal display apparatus of the first embodiment is further provided with a reflection polarizing plate 16 between the liquid crystal display device 1 and the diffusion member 31 disposed the planar surface 28 side of the optical film. The reflection polarizing plate 16, which has a transmission axis 16a and a reflection axis 16b perpendicular to each other (see FIG. 9), is to transmit linearly polarized light having a plane of vibration of light parallel to the transmission axis 16a, and to reflect linearly polarized light parallel to the reflection axis 16b. A diffusion layer 17 is provided between the reflection polarizing plate 16 and the liquid crystal display device 1. The configuration is similar to that in the first embodiment in other respects.

Figure 9:
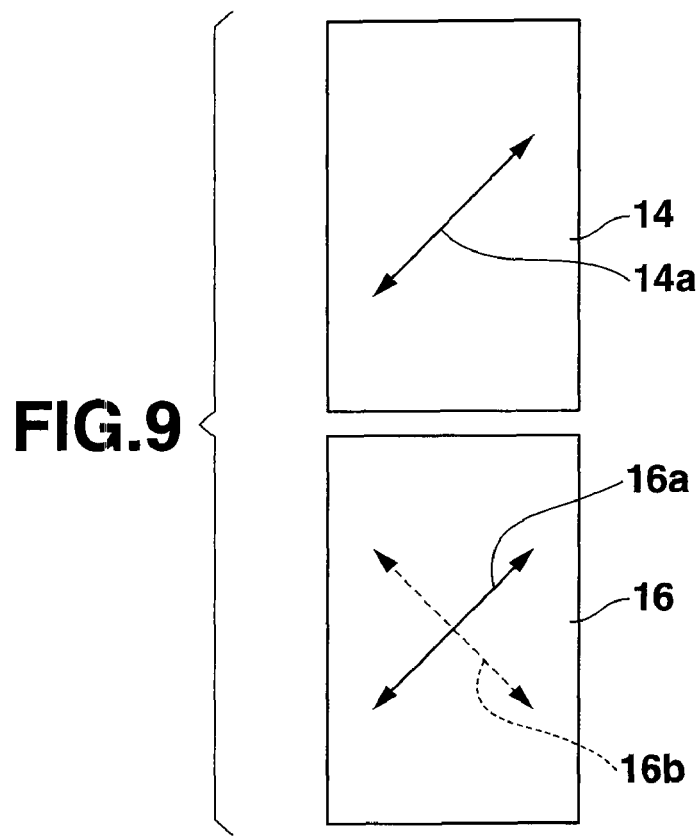
FIG. 9 is a diagram showing the direction of a transmission axis of a rear polarizing plate, and the directions of a transmission axis and a reflection axis of a refection polarizing plate, in a liquid crystal display device in the second embodiment.

FIG. 9 shows the direction of a transmission axis 14a of the rear polarizing plate 14 that is the polarizing plate located on the side of the optical film 27 of the pair of polarizing plates 13 and 14 of the liquid crystal display device 1, and the directions of the transmission axis 16a and the reflection axis 16b of the reflection polarizing plate 16. The reflection polarizing plate 16 is disposed so that its transmission axis 16a is substantially parallel to the transmission axis 14a of the rear polarizing plate 14 of the liquid crystal display device 1.

The diffusion layer 17 is made of a transparent resin film in which scattering particles are dispersed. The diffusion layer 17 is disposed so that its one surface is affixed to the outer surface of the rear polarizing plate 14 of the liquid crystal display device 1. The reflection polarizing plate 16 is disposed by being affixed to the other surface of the diffusion layer 17. A stack of the optical film 27 and the diffusion member 31 disposed the planar surface 28 side of the optical film 27 is disposed by affixing the diffusion member 31 to the reflection polarizing plate 16.

In the liquid crystal display apparatus of this embodiment, the reflection polarizing plate 16 is further disposed between the liquid crystal display device 1 and the diffusion member 31 located on the planar surface 28 side of the optical film. Thus, light that has entered at the observation side in the case of the reflection display and illumination light irradiated from the surface light source in the case of the transmission display are more efficiently used. Consequently, the reflection display and the transmission display can be brighter.

Figure 10:
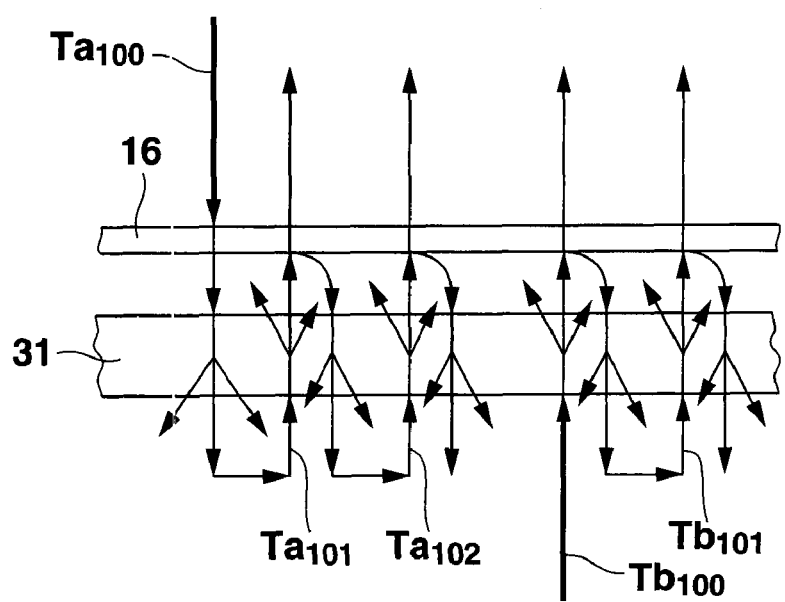
FIG. 10 is a diagram of transmission light and reflection light in the refection polarizing plate.

FIG. 10 is a diagram of transmission light and reflection light in the reflection polarizing plate 16. In the liquid crystal display apparatus of this embodiment, the reflection polarizing plate 16 is disposed so that its transmission axis 16a is substantially parallel to the transmission axis 14a of the rear polarizing plate 14 of the liquid crystal display device. Thus, in the case of the reflection display, light Ia100 that has penetrated the liquid crystal display device 1 from the observation side, has been diffused by the diffusion layer 17 and then entered the reflection polarizing plate 16, that is, linearly polarized light parallel to the transmission axis 14a of the rear polarizing plate 14 of the liquid crystal display device 1 penetrates the reflection polarizing plate 16, is diffused by the diffusion member 31, and is reflected by the optical film 27.

Then, light Ia101 that has been reflected by the optical film 27 is further diffused by the diffusion member 31, and enters the reflection polarizing plate 16. Out of this light Ta101, a linearly polarized light component parallel to the transmission axis 16a of the reflection polarizing plate 16 penetrates the reflection polarizing plate 16, is diffused by the diffusion layer 17, and then enters the liquid crystal display device 1.

Furthermore, out of the light that has been reflected by the optical film 27 and then entered the reflection polarizing plate 16, a linearly polarized light component parallel to the reflection axis 16b of the reflection polarizing plate 16 is reflected by the reflection polarizing plate 16, returns to the optical film 27, is diffused by the diffusion member 31, and is again reflected by the optical film 27.

Light Ia102 again reflected by the optical film 27 is further diffused by the diffusion member 31, and enters the reflection polarizing plate 16. Out of this light Ta102, a linearly polarized light component parallel to the transmission axis 16a of the reflection polarizing plate 16 penetrates the reflection polarizing plate 16, is diffused by the diffusion layer 17, and then enters the liquid crystal display device 1. A linearly polarized light component parallel to the reflection axis 16b of the reflection polarizing plate 16 is reflected by the reflection polarizing plate 16, and again reflected by the optical film 27.

Afterwards, the same process is repeated. Thus, in the case of the reflection display, the light that has entered at the observation side and penetrated the liquid crystal display device 1 is caused to efficiently enter the liquid crystal display device 1 again by the reflection polarizing plate 16 and the optical film 27. Consequently, bright reflection display can be performed.

On the other hand, in the case of the transmission display, illumination light Ib100 that has been irradiated from the surface light source 18 and penetrated the optical film 27 is diffused by the diffusion member 31, and enters the reflection polarizing plate 16. Out of this light Tb100, a linearly polarized light component parallel to the transmission axis 16a of the reflection polarizing plate 16 penetrates the reflection polarizing plate 16, is diffused by the diffusion layer 17, and then enters the liquid crystal display device 1.

Moreover, out of the light Tb100 that has been irradiated from the surface light source 18, penetrated the optical film 27 and then entered the reflection polarizing plate 16, a linearly polarized light component parallel to the reflection axis 16b of the reflection polarizing plate 16 is reflected by the reflection polarizing plate 16, returns to the optical film 27, is diffused by the diffusion member 31, and is reflected by the optical film 27.

Light Ib101 reflected by the optical film 27 is further diffused by the diffusion member 31, and enters the reflection polarizing plate 16. Out of this light Tb101, a linearly polarized light component parallel to the transmission axis 16a of the reflection polarizing plate 16 penetrates the reflection polarizing plate 16, is diffused by the diffusion layer 17, and then enters the liquid crystal display device 1. A linearly polarized light parallel to the reflection axis 16b of the reflection polarizing plate 16 is reflected by the reflection polarizing plate 16, and again reflected by the optical film 27.

Afterwards, the same process is repeated. Thus, in the case of the transmission display, the illumination light irradiated from the surface light source 18 is caused to efficiently enter the liquid crystal display device 1 again by the reflection polarizing plate 16 and the optical film 27. Consequently, bright transmission display can be performed.

Third Embodiment

Figure 11:
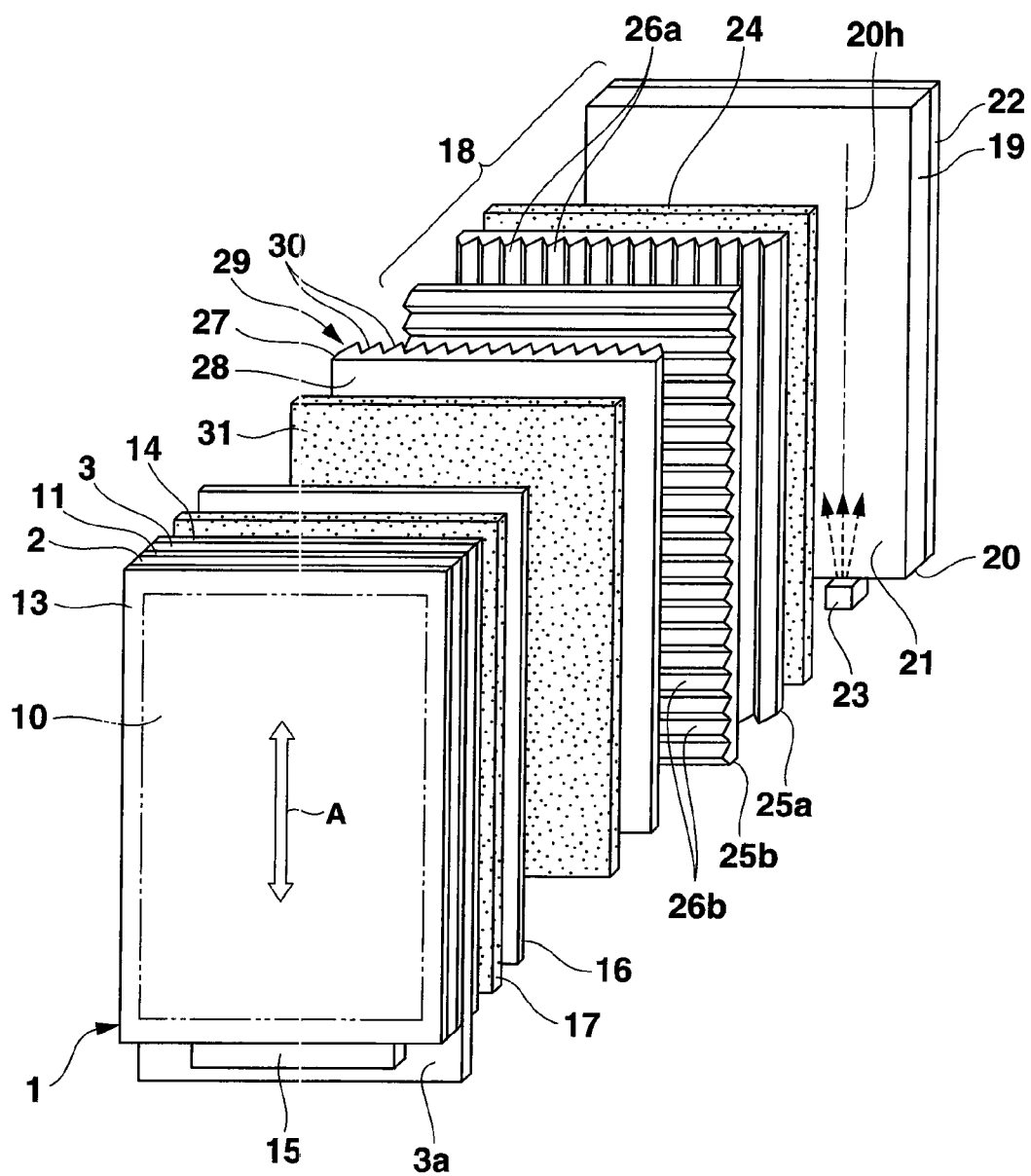
FIG. 11 is an exploded perspective view of a liquid crystal display apparatus showing a third embodiment of this invention.

FIG. 11 is an exploded perspective view of a liquid crystal display apparatus showing a third embodiment of this invention. It is to be noted that the corresponding members in the first embodiment will be represented by the same references in this embodiment, and the description of these numbers will not be omitted.

In this embodiment, the liquid crystal display apparatus of the first embodiment is provided with a reflection polarizing plate 16 and a diffusion layer 17 arranged between the liquid crystal display device 1 and the diffusion member 31 disposed on the planar surface 28 side of the optical film 27 in the same manner as in the second embodiment. Furthermore, a first prism array 25a disposed on the exit face 21 side of the light guide plate 19 of the surface light source 18 and a second prism array 25b disposed between the first prism array 25a and the optical film 27 are stacked onto each other. The configuration is similar to that in the first embodiment in other respects.

The first and second prism arrays 25a, 25b are made of a transparent member formed into a prism surface. The surfaces (hereinafter referred to as the planar surfaces) of the prism arrays facing the light guide plate 19 are formed into a planar shape. On the opposite surface (hereinafter referred to as the prism surface) of each prism array, that is, the surface facing the liquid crystal display device 1, a plurality of elongate microprisms 26a, 26b are arranged in parallel to each other in a direction perpendicular to their longitudinal directions. The microprisms are to collect light that has exited from the exit face 21 of the light guide plate 19 to apply the collected light to the liquid crystal display device 1.

Of these prism arrays 25a, 25b, the first prism array 25a disposed adjacent to the light guide plate 19 through the diffusion layer 24 is disposed so that the longitudinal direction of the microprisms 26a is substantially parallel to the normal direction 20h of the entrance end face 20 of the light guide plate 19. The planar surface of the prism array is affixed onto the diffusion layer 24.

Moreover, the second prism array 25b is disposed so that the longitudinal direction of the microprisms 26b is an arbitrary direction, and the planar surface of the prism array is in proximity to or in contact with the apexes of the plurality of microprisms 26a of the first prism array 25a.

In this embodiment, the second prism array 25b is disposed so that the longitudinal direction of the microprisms 26b of the second prism array is substantially perpendicular to the longitudinal direction of the microprisms 26a (the normal direction 20h of the entrance end face 20 of the light guide plate 19).

It is to be noted that when the longitudinal direction of the microprisms 26b of the second prism array 25b is perpendicular to that of the microprisms 26a of the first prism array 25a in this manner, the longitudinal direction of the microprisms 26b of the second prism array 25b intersects with the longitudinal direction of the microprisms 30 of the optical film 27 disposed adjacent to the second prism array 25b. Accordingly, the second prism array 25b is preferably disposed to leave a space between the second prism array and the optical film 27, whereby the apexes of the microprisms 26b of the second prism array 25b and the apexes of the microprisms 30 of the optical film 27 do not come in contact with one another and hence are not damaged.

In the liquid crystal display apparatus of this embodiment, on the exit face 21 side of the light guide plate 19 of the surface light source 18, the first and second prism arrays 25a, 25b are stacked onto each other. The two prism arrays are arranged in this manner, whereby light that has exited from the exit face 21 of the light guide plate 19 and has been diffused by the diffusion layer 24 is condensed by the two prism arrays 25a, 25b in the normal direction of the liquid crystal display device 1, and illumination light having a higher front luminance can be irradiated toward the liquid crystal display device 1.

(Configuration Example of Liquid Crystal Display Apparatus to be Mounted on Electronic Equipment)

Figure 12:
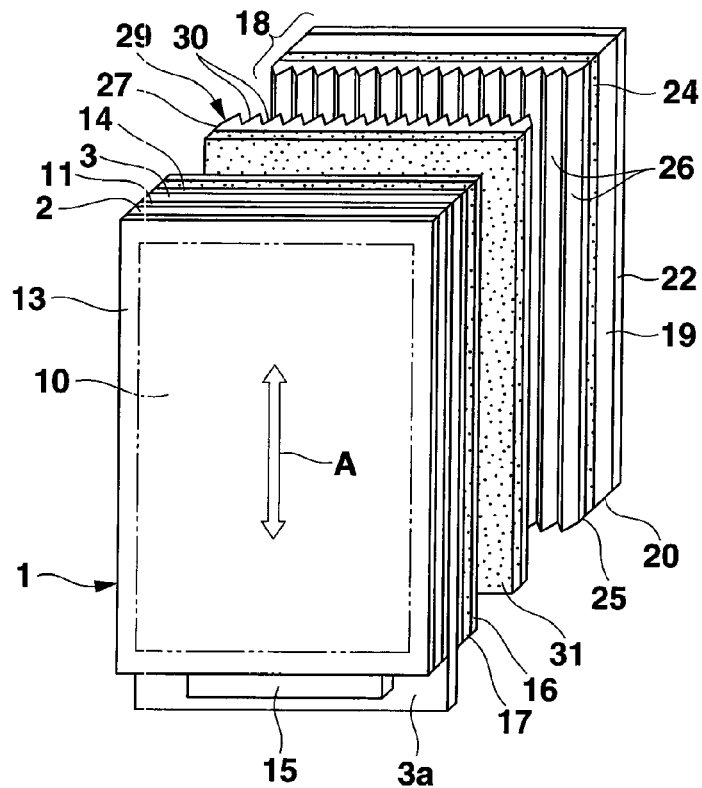
FIG. 12 is a perspective view showing an example of the configuration of a liquid crystal display apparatus to be mounted on electronic equipment.
Figure 13:
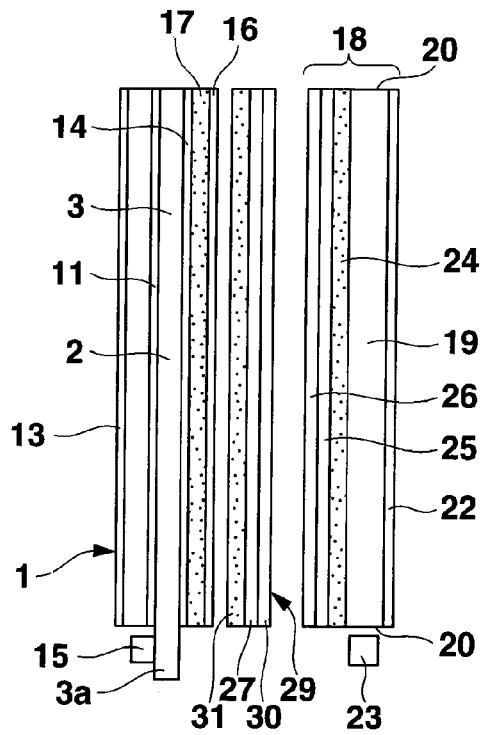
FIG. 13 is a side view of the liquid crystal display apparatus in FIG. 12.

FIGS. 12 and 13 show an example of the configuration of a liquid crystal display apparatus to be mounted on electronic equipment, FIG. 12 is a perspective view of the liquid crystal display apparatus, and FIG. 13 is a side view of the liquid crystal display apparatus.

This liquid crystal display apparatus is to be mounted on electronic equipment such as a cellular phone having a display section formed into a rectangular shape whose width is greater in the longitudinal direction of the section than in its lateral direction, when the apparatus is used. The liquid crystal display device 1 has the screen area 10 formed into a rectangular shape that is sized greater in its longitudinal direction, and has a viewing angle azimuth A in the longitudinal direction of the screen area 10. The optical film 27 is disposed so that the longitudinal direction of the microprisms 30 is substantially parallel to the viewing angle azimuth A of the liquid crystal display device 1.

Moreover, the light guide plate 19 of the surface light source 18 is made of a plate-like member formed into a rectangular shape that is sized greater in its longitudinal direction to correspond to the shape of the screen area 10 of the liquid crystal display device 1. The entrance end face 20 is formed on an end face of the light guide plate corresponding to one of short sides thereof. This light guide plate 19 is disposed so that the normal direction of the entrance end face 20 of the light guide plate is substantially parallel to the viewing angle azimuth A of the liquid crystal display device 1 and so that the short side of the light guide plate provided with the entrance end face corresponds to the lower side of the screen area 10 of the liquid crystal display device 1.

Furthermore, the surface light source 18 includes one prism array 25 disposed on the side of the exit face of the light guide plate 19, and this prism array is disposed so that the longitudinal direction of the microprisms 26 is substantially parallel to the normal direction of the entrance end face 20 of the light guide plate 19 and to the longitudinal direction of the microprisms 30 of the optical film 27.

This liquid crystal display apparatus corresponds to the liquid crystal display apparatus of the second embodiment shown in FIG. 8. The reflection polarizing plate 16 disposed between the liquid crystal display device 1 and the diffusion member 31 disposed on the planar surface 28 side of the optical film 27 is affixed to The other surface of the diffusion layer 17 affixed to The outer surface of the rear polarizing plate 14 of the liquid crystal display device 1.

Moreover, the prism array 25 of the surface light source 18 is affixed onto the diffusion layer 24 affixed onto the exit face 21 of the light guide plate 19, and the diffusion member 31 disposed on the planar surface 28 side of the optical film 27 is affixed onto the planar surface 28 of the optical film 27.

It is to be noted that in FIGS. 12 and 13, a space is provided between the reflection polarizing plate 16 and the diffusion member 31, and a space is provided between the optical film 27 and the prism array 25 of the surface light source 18. However, the diffusion member 31 is affixed to the reflection polarizing plate 16, and a stack of the optical film 27 and the diffusion member 31 is disposed so as to affix the diffusion member 31 to the reflection polarizing plate 16. The surface light source 18 is disposed so that the apexes of the plurality of microprisms 26 of the prism array 25 are in proximity to or in contact with the apexes of the plurality of microprisms 30.

This liquid crystal display apparatus has the above configuration. Accordingly, in a case where the apparatus is mounted on electronic equipment such as the cellular phone having the display section formed into the rectangular shape that is sized greater in its longitudinal direction, the display section having the rectangular shape that is sized greater in its longitudinal direction can display an image having a large viewing angle in a direction perpendicular to the longitudinal direction of the display section.

(Another Configuration Example of Liquid Crystal Display Apparatus to be Mounted on Electronic Equipment)

Figure 14:
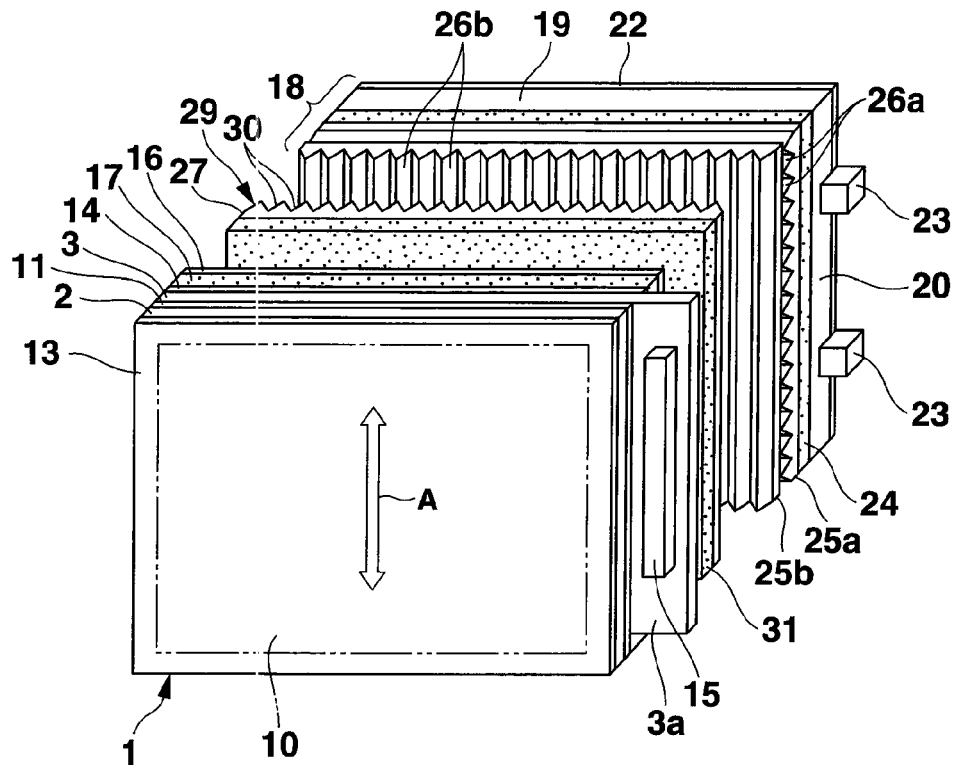
FIG. 14 is a perspective view showing another example of the configuration of a liquid crystal display apparatus to be mounted on electronic equipment.
Figure 15:
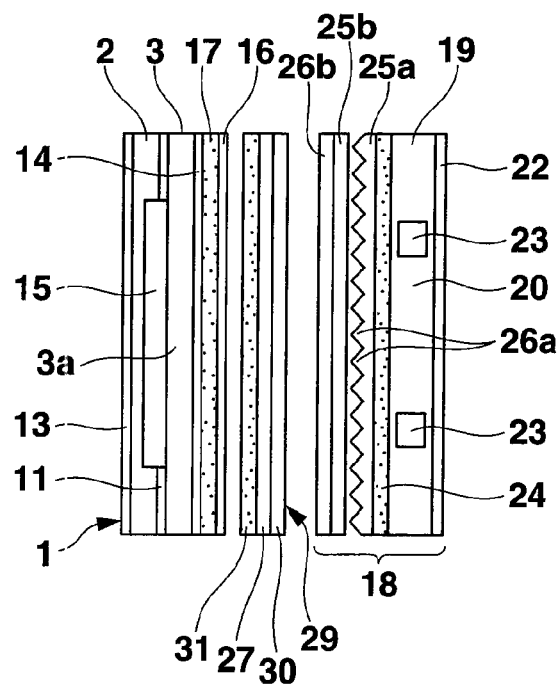
FIG. 15 is a side view of the liquid crystal display apparatus in FIG. 14.

FIGS. 14 and 15 show another example of the configuration of a liquid crystal display apparatus to be mounted on electronic equipment, FIG. 14 is a perspective view of the liquid crystal display apparatus, and FIG. 15 is a side view of the liquid crystal display apparatus.

This liquid crystal display apparatus is mounted on electronic equipment such as a digital camera having a display section formed into a rectangular shape whose width is greater in the lateral direction of the section than in the longitudinal direction thereof, when the apparatus is used. A liquid crystal display device 1 has a screen area 10 formed into a rectangular shape that is sized greater in its lateral direction, and has a viewing angle azimuth A in the longitudinal direction of the screen area 10. An optical film 27 is disposed so that the longitudinal direction of a plurality of microprisms 30 is substantially parallel to the viewing angle azimuth A of the liquid crystal display device 1.

Moreover, a light guide plate 19 of a surface light source 18 is made of a plate-like member formed into a rectangular shape that is sized greater in its longitudinal direction to correspond to the shape of the screen area 10 of the liquid crystal display device 1. An entrance end face 20 is formed on an end face of the light glide plate corresponding to one of short sides thereof. This light guide plate 19 is disposed so that the normal direction of the entrance end face 20 of the light guide plate is substantially perpendicular to the viewing angle azimuth A of the liquid crystal display device 1 and so that the short side of the light guide plate provided with the entrance end face 20 corresponds to one of the left and right sides of the screen area 10 of the liquid crystal display device 1.

Furthermore, the surface light source 18 includes a first prism array 25a that is disposed on the exit face side of the light guide plate 19 so that the longitudinal direction of a plurality of microprisms 26a is substantially parallel to the normal direction of the entrance end face 20 of the light guide plate 19; and a second prism array 25b disposed between the first prism array 25a and the optical film 27 so that the longitudinal direction of a plurality of microprisms 26b is substantially parallel to the longitudinal direction of the microprisms 30 of the optical film 27.

This liquid crystal display apparatus is obtained by rotating the liquid crystal display apparatus of the third embodiment shown in FIG. 11 by 90° as seen from an observation side. Furthermore, the viewing angle azimuth A of the liquid crystal display device 1 is set to the longitudinal direction of the screen area 10, and the longitudinal direction of the microprisms 30 of the optical film 27 is perpendicular to that of the third embodiment. A reflection polarizing plate 16 disposed between the liquid crystal display device 1 and a diffusion member 31 disposed on the planar surface 28 side of the optical film 27 is affixed to the other surface of a diffusion layer 17 affixed to the outer surface of a rear polarizing plate 14 of the liquid crystal display device 1.

Moreover, the first prism array 25a of the surface light source 18 is affixed onto a diffusion layer 24 affixed onto an exit face 21 of the light guide plate 19. The second prism array 25b is disposed so that the planar surface of the array is in proximity to or in contact with the apexes of the microprisms 26a of the first prism array 25a. The diffusion member 31 disposed or the planar surface 28 side of the optical film 27 is affixed onto the planar surface 28 of the optical film 27.

It is to be noted that in FIGS. 14 and 15, a space is provided between the reflection polarizing plate 16 and the diffusion member 31, and a space is provided between the optical film 27 and the second prism array 25b of the surface light source 18. However, the diffusion member 31 is affixed to the reflection polarizing plate 16, and a stack of the optical film 27 and the diffusion member 31 is disposed so as to affix the diffusion member 31 to the reflection polarizing plate 16. The surface light source 18 is disposed so that the apexes of the plurality of microprisms 26b of the second prism array 25b are in proximity to or in contact with the apexes of the plurality of microprisms 30 of the optical film 27.

This liquid crystal display apparatus has the above configuration. Accordingly, in a case where the apparatus is mounted on electronic equipment such as the digital camera having the display section formed into the rectangular shape that is sized greater in its lateral direction, the display section having the rectangular shape that is sized greater in its lateral direction can display an image having a large viewing angle in a direction perpendicular to the longitudinal direction of the display section.

Fourth Embodiment

Figure 16:
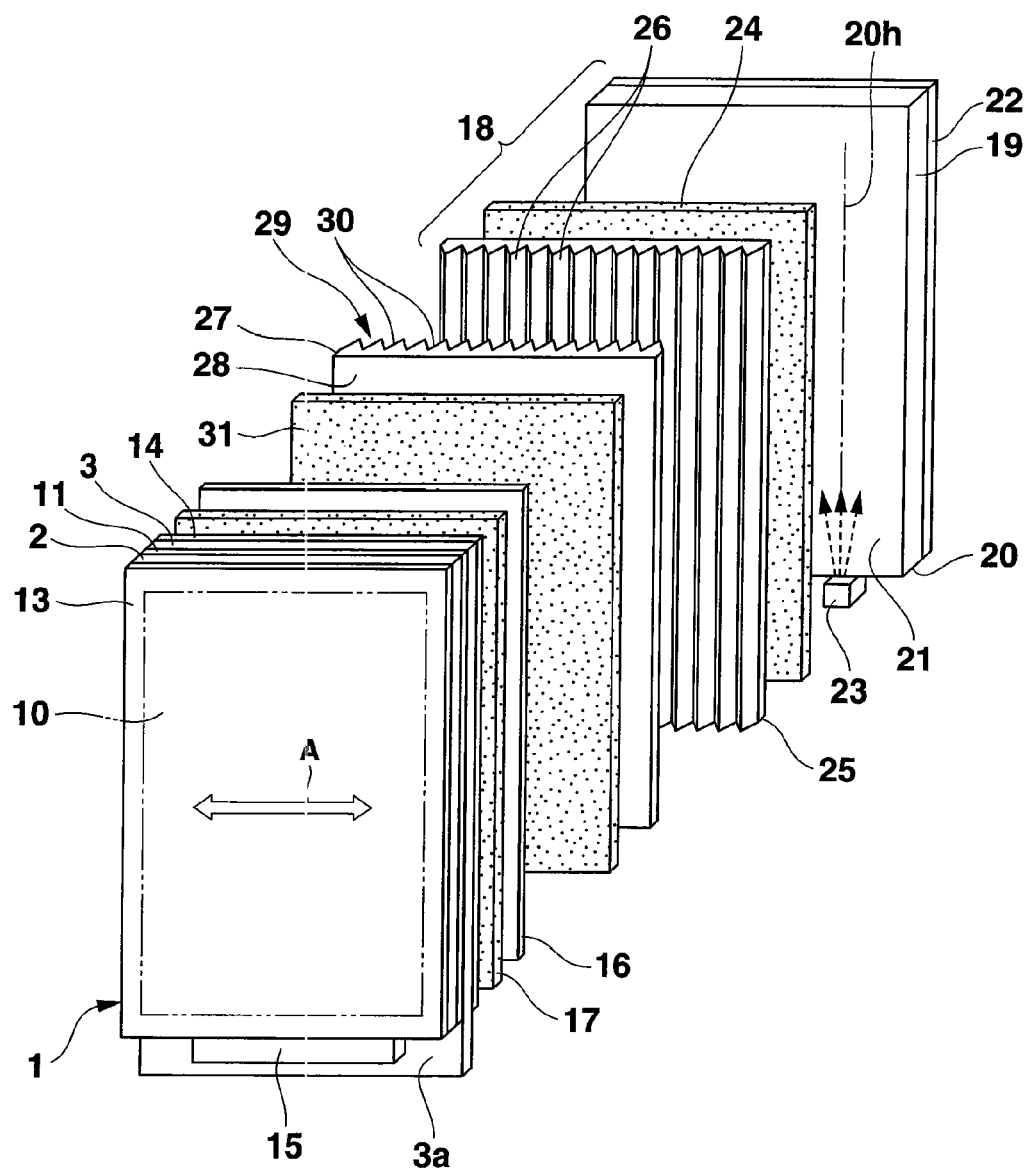
FIG. 16 is an exploded perspective view of a liquid crystal display apparatus showing a fourth embodiment of this invention.

FIG. 16 is an exploded perspective view of a liquid crystal display apparatus showing a fourth embodiment of this invention. In this liquid crystal display apparatus, the optical film 27 is disposed so that the longitudinal direction a plurality of microprisms 30 is substantially parallel to an viewing angle azimuth A of a liquid crystal display device 1.

In this embodiment, the liquid crystal display device 1 has a screen area 10 formed into a rectangular shape whose width is greater in the lateral direction of the area than in the longitudinal direction thereof and that is sized greater in its longitudinal direction, and the device is designed so as to have the viewing angle azimuth A in the lateral direction of the screen area 10.

It is to be noted that the liquid crystal display apparatus of this embodiment, between the liquid crystal display device 1 and a diffusion member 31 disposed on the planar surface side of the optical film 27, a reflection polarizing plate 16 and a diffusion layer 17 disposed on the side of the surface of the reflection polarizing plate 16 facing the liquid crystal display device 1 are arranged, and on the side of the exit face of a light guide plate 19 of a surface light source 18, one prism array 25 is disposed. The apparatus has the same configuration as that of the liquid crystal display apparatus of the second embodiment shown in FIG. 8 except the viewing angle azimuth A of the liquid crystal display device 1.

This liquid crystal display apparatus includes the liquid crystal display device 1 having the screen area 10 formed into the rectangular shape that is sized greater in the longitudinal direction thereof, and having the viewing angle azimuth A in the lateral direction of the screen area 10. The optical film 27 is disposed so that the longitudinal direction of the plurality of microprisms 30 is substantially perpendicular to the viewing angle azimuth A of the liquid crystal display device 1. Accordingly, it is possible to display an image having a large viewing angle in a direction parallel to the viewing angle azimuth A, that is, a direction perpendicular to the longitudinal direction of the screen area 10.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus comprising:
   a liquid crystal display device including a pair of substrates that are arranged so as to face to each other through a space with a plurality of electrodes formed on at least one of opposite surfaces, a liquid crystal layer sealed into the space between the substrates, and a pair of polarizing plates arranged sandwiching the pair of substrates therebetween;
   a surface light source to irradiate illumination light toward the liquid crystal display device;
   an optical film made of a transparent film-like member and having two mutually faced film surfaces, a first one of the two film surfaces being formed into a planar shape, and a second one of the two film surfaces being formed into a convexo-concave structure in which a plurality of elongate microprisms are arranged in parallel to each other, the optical film being disposed between the liquid crystal display device and the surface light source so that the first one of the two film surfaces is directed toward the liquid crystal display device; and
   a diffusion member disposed between the optical film and the liquid crystal display device,
   wherein the surface light source includes:
      a light guide plate which is made of a transparent plate-like member provided with an entrance end face where light enters and which has two plate surfaces, a first one of the two plate surfaces being formed as an exit face for the light that has entered through the entrance end face, and the light guide plate being disposed so that the exit face is directed toward the liquid crystal display device;
      a plurality of light emitting elements arranged to face the entrance end face of the light guide plate; and
      a first prism array disposed between the light guide plate and the optical film, wherein the first prism array is provided independently of the optical film and is provided with a plurality of elongate microprisms arranged in parallel to each other and configured to collect the light that has exited from the exit face of the light guide plate to apply the collected light to the liquid crystal display device, the first prism array being disposed so that a longitudinal direction of the microprisms of the first prism array is parallel to a normal direction of the entrance end face of the light guide plate, and wherein the first prism array is made of a transparent member whose surface facing the light guide plate is formed into a planar surface and whose opposite surface is formed into a prism surface provided with the plurality of microprisms, and the first prism array is disposed so that the longitudinal direction of the microprisms of the first prism array is parallel to a longitudinal direction of the microprisms of the optical film.

2. The liquid crystal display apparatus according to claim 1, wherein the optical film is disposed so that the longitudinal direction of the microprisms of the optical film is parallel to a viewing angle azimuth of the liquid crystal display device.

3. The liquid crystal display apparatus according to claim 1, wherein the microprisms of the optical film have a sectional shape of an isosceles triangle whose center is in a normal direction of the liquid crystal display device.

4. The liquid crystal display apparatus according to claim 1, further comprising a reflection polarizing plate, having a transmission axis and a reflection axis perpendicular to each other, to transmit linearly polarized light having a plane of vibration of light parallel to the transmission axis, and to reflect linearly polarized light parallel to the reflection axis, the reflection polarizing plate being disposed between the liquid crystal display device and the diffusion member so that the transmission axis of the reflection polarizing plate is parallel to a transmission axis of one of the pair of polarizing plates that is disposed between the liquid crystal layer and the optical film.

5. The liquid crystal display apparatus according to claim 1, further comprising a second prism array disposed between the light guide plate and the optical film, and provided with a plurality of elongate microprisms arranged in parallel to each other and configured to collect the light that has exited from the exit face of the light guide plate to apply the collected light to the liquid crystal display device, wherein the second prism array is made of a transparent member whose surface facing the light guide plate is formed into a planar surface and whose opposite surface is formed into a prism surface provided with the plurality of microprisms, and wherein the second prism array is disposed between the first prism array and the optical film so that a longitudinal direction of the microprisms of the second prism array is perpendicular to the longitudinal direction of the microprisms of the optical film.

6. The liquid crystal display Apparatus according to claim 1, wherein the light guide plate is disposed so that the normal direction of the entrance end face of the light guide plate is parallel to a viewing angle azimuth of the liquid crystal display device.

7. The liquid crystal display apparatus according to claim 6, further comprising a reflection polarizing plate, having a transmission axis and a reflection axis perpendicular to each other, to transmit linearly polarized light having a plane of vibration of light parallel to the transmission axis, and to reflect linearly polarized light parallel to the reflection axis, the reflection polarizing plate being disposed between the liquid crystal display device and the diffusion member so that the transmission axis of the reflection polarizing plate is parallel to a transmission axis of one of the pair of polarizing plates that is disposed between the liquid crystal layer and the optical film.

8. The liquid crystal display apparatus according to claim 6, further comprising a second prism array disposed between the light guide plate and the optical film, and provided with a plurality of elongate microprisms arranged in parallel to each other and configured to collect the light that has exited from the exit face of the light guide plate to apply the collected light to the liquid crystal display device, wherein the second prism array is disposed between the first prism array and the optical film so that a longitudinal direction of the microprisms of the second prism array is perpendicular to the longitudinal direction of the microprisms of the optical film.

9. The liquid crystal display apparatus according to claim 1, wherein:

the liquid crystal display device has a viewing angle azimuth parallel to a long side of a screen area formed into a rectangular shape, the optical film is disposed so that the longitudinal direction of the microprisms of the optical film is parallel to the viewing angle azimuth of the liquid crystal display device, and the light guide plate is made of the plate-like member that is formed into a rectangular shape corresponding to the rectangular shape of the screen area of the liquid crystal display device and that is provided with the entrance end face on an end face of the light guide plate corresponding to a short side of the rectangular shape of the light guide plate.

10. The liquid crystal display apparatus according to claim 1, wherein:

the liquid crystal display device has a viewing angle azimuth parallel to a long side of a screen area formed into a rectangular shape, the optical film is disposed so that the longitudinal direction of the microprisms of the optical film is parallel to the viewing angle azimuth of the liquid crystal display device, the light guide plate is made of the plate-like member that is formed into a rectangular shape corresponding to the rectangular shape of the screen area of the liquid crystal display device and that is provided with the entrance end face on an end face of the light guide plate corresponding to a short side of the rectangular shape of the light guide plate, and the liquid crystal display apparatus further comprises a reflection polarizing plate, having a transmission axis and a reflection axis perpendicular to each other, to transmit linearly polarized light having a plane of vibration of light parallel to the transmission axis, and to reflect linearly polarized light parallel to the reflection axis, the reflection polarizing plate being disposed between the liquid crystal display device and the diffusion member so that the transmission axis of the reflection polarizing plate is parallel to a transmission axis of one of the pair of polarizing plates that is disposed between the liquid crystal layer and the optical film.

11. The liquid crystal display apparatus according to claim 1, further comprising a second prism array disposed between the light guide plate and the optical film, and provided with a plurality of elongate microprisms arranged in parallel to each other and configured to collect the light that has exited from the exit face of the light guide plate to apply the collected light to the liquid crystal display device, wherein the liquid crystal display device has a viewing angle azimuth parallel to a long side of a screen area formed into a rectangular shape, the optical film is disposed so that the longitudinal direction of the microprisms of the optical film is parallel to the viewing angle azimuth of the liquid crystal display device, the light guide plate is made of the plate-like member that is formed into a rectangular shape corresponding to the rectangular shape of the screen area of the liquid crystal display device and that is provided with the entrance end face on an end face of the light guide plate corresponding to a short side of the rectangular shape of the light guide plate, and the second prism array is disposed between the first prism array and the optical film so that a longitudinal direction of the microprisms of the second prism array is perpendicular to the longitudinal direction of the microprisms of the optical film.

12. The liquid crystal display apparatus according to claim 1, wherein the liquid crystal display device has a viewing angle azimuth parallel to a short side of a screen area formed into a rectangular shape, the optical film is disposed so that the longitudinal direction of the microprisms of the optical film is perpendicular to the viewing angle azimuth of the liquid crystal display device, the light guide plate is made of the plate-like member that is formed into a rectangular shape corresponding to the rectangular shape of the screen area of the liquid crystal display device and that is provided with the entrance end face on an end face of the light guide plate corresponding to a short side of the rectangular shape of the light guide plate.

13. The liquid crystal display apparatus according to claim 12, further comprising a reflection polarizing plate, having a transmission axis and a reflection axis perpendicular to each other, to transmit linearly polarized light having a plane of vibration of light parallel to the transmission axis, and to reflect linearly polarized light parallel to the reflection axis, the reflection polarizing plate being disposed between the liquid crystal display device and the diffusion member so that the transmission axis of the reflection polarizing plate is parallel to a transmission axis of one of the pair of polarizing plates that is disposed between the liquid crystal layer and the optical film.

* * * * *